United States Patent [19]

Emori

[11] Patent Number: 4,984,094
[45] Date of Patent: Jan. 8, 1991

[54] HIGH DEFINATION VIDEO SIGNAL RECORDING SYSTEM

[75] Inventor: Takahisa Emori, Tokyo, Japan

[73] Assignee: Tatsu Corporation Co., Ltd., Tokyo, Japan

[21] Appl. No.: 215,214

[22] Filed: Jul. 5, 1988

[30] Foreign Application Priority Data

Jul. 8, 1987 [JP] Japan ................... 62-170516

[51] Int. Cl.⁵ .............................. H04N 5/92
[52] U.S. Cl. ................................... 358/335
[58] Field of Search .......... 360/33.1, 9.1, 11.1, 360/10.3, 22, 32, 35.1, 38.1, 64; 358/310, 312, 313, 327, 328, 335

[56] References Cited

U.S. PATENT DOCUMENTS

| | | | |
|---|---|---|---|
| 3,535,440 | 10/1970 | Watanabe et al. | 360/33.1 |
| 4,139,869 | 2/1979 | Holt | 360/35.1 |
| 4,611,250 | 9/1986 | Yoshinaka et al. | 358/335 |
| 4,660,096 | 4/1987 | Arlan et al. | 358/310 |
| 4,805,034 | 2/1989 | Kitamura et al. | 358/310 |
| 4,812,920 | 3/1989 | Nagashima et al. | 358/310 |
| 4,831,463 | 5/1989 | Faroudja | 358/310 |
| 4,839,744 | 6/1989 | Sasaki et al. | 358/327 |

OTHER PUBLICATIONS

Nikkei Electronics 1986.9.8 (No. 403).

Primary Examiner—Donald McElheny, Jr.
Attorney, Agent, or Firm—Ladas & Parry

[57] ABSTRACT

A video signal recording system records a video signal after sampling with a sampling frequency $f_c$ defined by $$f_c = (N/M) \times f_H$$

where $N/M$ is a reduced fraction number larger than one and $f_H$ is a horizontal scanning frequency. The sampling frequency $f_H$ is set larger than the maximum frequency of the video signal but may be equal to or smaller than twice the maximum recording frequency of a recording medium. In a reproduction mode, each two frames of the video signals thus sampled and reproduced are superposed alternately in first and second field memories and the content of the first and second field memories are read out at a speed twice as high as the sampling frequency $f_H$.

4 Claims, 4 Drawing Sheets (A)

(B)

(C)

HIGH DEFINATION VIDEO SIGNAL RECORDING SYSTEM

BACKGROUND OF THE INVENTION

The present invention generally relates to video signal transmission systems, and in particular to a video signal transmission system for transmitting a video signal using a band compression technique.

Various transmission systems are proposed for transmission of a video signal via various signal transmission media including magnetic recording medium, by converting the video signal into a predetermined signal format. The ultimate objective of such video signal transmission systems is to achieve a high resolution video transmission and processing.

Recent progress in digital memories supported by the progress in design and manufacturing technique of integrated circuits have made it possible to construct digital memories with low costs. Using such digital memories, improvement in the picture quality of the various video apparatus has been attempted.

For example, the picture quality of television is improved by a video processing using digital memories. Also, there is a so called non-interlace television system which apparently improves the resolution of the picture in the vertical direction by performing a non-interlace processing. In this processing, the digital memories are used for intrafield, interfield, or interframe processing.

The picture quality is also improved in the magnetic recording and reproducing apparatuses such as a video tape recorder by using digital field memories. The digital field memory is used, for example, for a noise reduction circuit which eliminates the noise from the picture by utilizing the field correlation of the video signal.

However, such a television or video tape recorder using the digital memories are generally still insufficient in achieving the desired picture quality. In the case of the video tape recorder using noise reduction circuit, in particular, the improvement in the picture quality is attempted only by elimination of the noise from the picture. In this way, substantial improvement in the actual resolution cannot be not obtained.

On the other hand, there is a so called "High Definition Television System" proposed by the Nippon Hoso Kyokai (NHK) which substantially improves the resolution and picture quality. Further, there is proposed a high resolution video tape recorder in which the design of the magnetic head and the circuit is also changed. In combination with a high performance magnetic tape, such a high resolution video tape recorder achieves the recording and reproduction of frequency modulated luminance signal which has a higher carrier frequency and a larger bandwidth as compared with those for the conventional video tape recorder. Such a high resolution video tape recorder indeed provides a reproduced picture having a substantially improved resolution. Unfortunately, such a high resolution video tape recorder is not compatible with the conventional home video tape recorder which is commonly used. The magnetic tape for use in such a high resolution video tape recorder is also not compatible with the conventional apparatus. Similarly, the aforementioned High Definition Television System is not compatible with the current video signal transmission system such as the NTSC system according to which the current television receivers are designed.

SUMMARY OF THE INVENTION

Accordingly, it is a general object of the present invention to provide a novel and useful video signal transmission system in which the aforementioned problems are eliminated.

Another and more specific object of the present invention is to provide a video signal transmission system which provides a transmission and reproduction of a high resolution picture, while maintaining compatibility with the conventional video system.

Another object of the present invention is to provide a video signal transmission system which transmits a high resolution video signal via a conventional signal transmission medium and at the same time achieves a compatibility with the conventional video system such that the high resolution video signal can also be reproduced in the conventional receiving system with a tolerable quality of the reproduced picture.

Another object of the present invention is to provide a video signal transmission system for transmitting a video signal via a transmission medium in which a video signal having a maximum frequency $f_m$ to be transmitted is converted in a form of a sampled signal by sampling with a sampling frequency $f_c$ defined by an equation:

$$f_c = (N/M) \times f_H$$

where M and N are positive integers, N/M is a reduced fraction larger than one, and $f_H$ is a horizontal scanning frequency of the video signal, with N and M being chosen such that the frequency $f_c$ being larger than the frequency $f_m$ but smaller than twice the maximum frequency of the transmission medium, converting the sampled signal in a form of an analog video signal and sending out the analog video signal on the transmission medium, sampling the analog video signal transmitted through the transmission medium with the sampling frequency $f_c$ to form a resampled signal, storing each one field of the resampled signals corresponding to two successive frames alternately in a first and second field memories to form digital video signals representing superposition of two successive even and odd field video signals in said first and second field memories respectively, reading out the content of the first and second field memories alternately with a clock frequency $2f_c$, and converting the digital video signals thus read out from the first and second field memories in a form of analog signal to obtain a reproduced video signal. According to the present invention, the sampling frequency $f_c$ can be chosen lower than the Nyquist frequency $2f_m$ and the frequency band required for the transmission of the video signal is reduced or compressed. Further, as a result of the use of the clock frequency set to $2f_c$ at the time of reading of the memories, the sampling frequency for the reproduced video signal becomes apparently equivalent to $2f_c$ and the resolution of the reproduced video signal is significantly improved. Further, the analog signal sent out on the transmission medium can be reproduced directly by the conventional reproducing apparatus. More specifically, the luminance signal in the NTSC, PAL or SECAM format video signal sampled with the sampling frequency $f_c$ in accordance with the transmission system of the present invention and sent out on the transmission medium can be reproduced directly by the conventional reproducing apparatus, although there is a slight deterioration in the picture quality. A similar situation also applies for the case of the carrier chrominance signal having the NTSC and PAL format. Thus, the present invention is compatible with the conventional video signal reproducing system.

Still other objects and further features of the present invention will become apparent from the following detailed description of the preferred embodiment when read in conjunction with the attached drawings.

DETAILED DESCRIPTION

Figure 1:
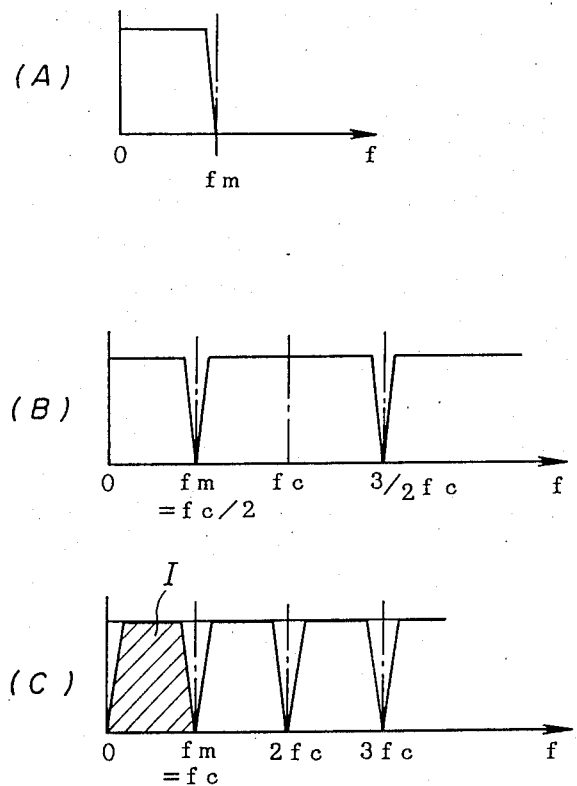
FIG. 1, (A)-(C) are spectrum diagrams for explanation of the principle of the video signal transmission system of the present invention.

First, the principle of the video signal transmission system of the present invention will be described with reference to FIG 1, (A)-(C) and FIG. 2.

Generally, a video signal to be transmitted is sampled in a transmission side with a sampling frequency $f_c$ which is set to a frequency higher than the frequency $f_m$ to form a sampled signal. An example of the spectrum of the video signal to be transmitted is shown in FIG. 1, (A). In such a case that the video signal is sampled with the sampling frequency $f_c$ chosen at least twice as large as the maximum frequency $f_m$ of the video signal (so called "Nyquist sampling"), no interference is caused in the sampled video signal as can be seen in the spectrum of the sampled signal in FIG. 1, (B). On the other hand, in such a case that the sampling is made with the sampling frequency $f_c$ which is set, for example, to $f_m$ which is lower than $2f_m$, the frequency spectrum of the sampled video signal takes a form as illustrated in FIG. 1, (C). In such a case, an interference is caused in the frequency range of the sampled signal as indicated by the slashed portion as a result of the folding. Such a phenomenon is well known from the sampling theorem.

Fortunately, the video signal generally has a line correlation, field correlation and a frame correlation. Therefore, there are cases that the video signal can be transmitted without substantial interference even if the sampling frequency $f_c$ is set lower than $2f_m$.

Figure 2:
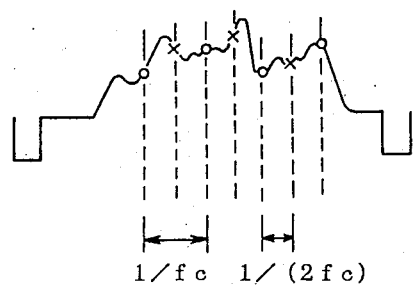
FIG. 2 is a waveform chart for explanation of the principle of the video signal transmission system of the present invention.

For example, in such a case that the video signal has an identical waveform as shown in FIG. 2 in successive two frames, the elimination of the interference is achieved as follows. For the sake of simplicity, the the video signal and a sampling signal by which the video signal is sampled are represented by sinusoidal waves. In FIG. 2, the sampling points corresponding to the sampling of the first field of the video signal are represented by open circles and the sampling points corresponding to the sampling of the second field of the video signal are represented by crosses. It should be noted that the sampling points in the second frame are displaced by a half period ($\frac{1}{2}f_c$) relative to the sampling points in the first frame.

In such a sampling of the video signal, the sampling signal for the first frame is represented, for example, by a function $\sin(2\pi f_c t)$ and the sampling signal for the second frame is represented by a function $\sin(2\pi f_c t - \pi)$ which can be rewritten as $-\sin(2\pi f_c t)$.

Representing the video signal by the function $\sin(2\pi ft)$, the interference signal component produced as a result of sampling and causes interference with the video signal in the first frame is represented as:

$$\sin(2\pi ft) \times \sin(2\pi f_c t) = -(\tfrac{1}{2})\{\cos 2\pi(f_c + f)t$$

$$-\cos 2\pi(f_c - f)t\}$$

Similarly, the signal component which interferes with the video signal in the second frame is represented as:

$$\sin(2\pi ft) \times \{-\sin(2\pi f_c t)\} = (\tfrac{1}{2})\{\cos 2\pi(f_c + f)t$$

$$-\cos 2\pi(f_c - f)t\}$$

For such interference components, an inequality $0 < f_c - f < (\tfrac{1}{2})f_c$ holds in the case of the so called sub-Nyquist sampling. More specifically, the first part of the inequality states that the sampling frequency $f_c$ should be larger than the maximum frequency $f_m$ of the video signal. The second part of the inequality $f_c - f < \tfrac{1}{2}f_c$ can be written as $2f_m \geq f_c$. This inequality states that the sampling frequency is chosen to be less than twice of the maximum frequency $f_m$ of the video signal and represents the condition of the sub-Nyquist sampling. When the video signal containing such interference component is passed through a transmission medium having a maximum transmission frequency less than $f_c$, the first term of the above equations is dropped and the interference component (spectral component) is represented by $(\tfrac{1}{2})\cos 2\pi(f_c - f)t$ for the first frame and $-(\tfrac{1}{2})\cos 2\pi(f_c - f)t$ for the second frame. These terms clearly indicate that the phases of the interference components in the first and second frames are inverted with respect to each other. In other words, the interference components are cancelled out in the first and second frames.

Further, the apparent sampling frequency of the video signal can be doubled when the sampled signals for the first frame and for the second frame are superposed. Thus, there is a possibility of the video signal having a high resolution being obtained with reduced sampling frequency.

From the considerations as aforementioned, the present invention uses the sampling frequency $f_c$ which is defined by an equation:

$$f_c \times N/M \times f_H$$

The sampling frequency has to be chosen higher than the maximum frequency $f_m$ of the video signal but may be lower than twice of the maximum frequency of conventional transmission media such as a magnetic tape so as to achieve compatibility with the conventional transmission media. As the maximum frequency of the conventional transmission media is generally slightly lower than the maximum frequency of the video signal, the sampling in accordance with the sampling frequency $f_c$ satisfies the condition of the sub-Nyquist sampling. Thus, the present video signal transmission system not only allows transmission of the high resolution video signal but also allows the transmission of the high resolution video signal through conventional transmission media having a limited bandwidth.

By chosing the ratio N/M to be a reduced fraction i.e. a rational number other than an integer, the overlapping of the sampling points in the successive frames of the video signal is avoided. For example, four types of sampling pattern or array of sampling points appear successively in two frames of the video signals in correspondence with each field as will be described later when N and M are chosen to 637 and 2, respectively. By assembling these sampling patterns, a high resolution video signal can be synthesized.

Figure 3:
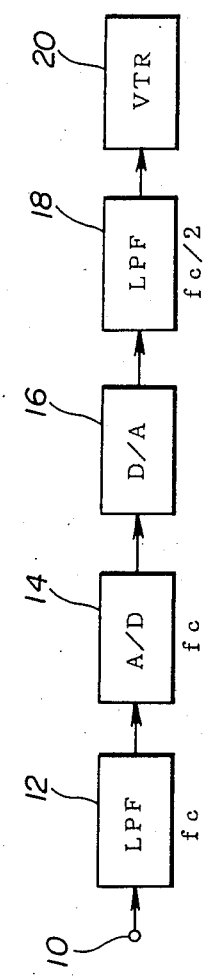
FIG. 3 is a system block diagram showing a part of an embodiment of the video signal transmission system of the present invention.

FIG. 3 shows a system block diagram showing a transmission side (recording system of a video tape recorder when a magnetic tape is used as a part of the transmission medium) of the video signal transmission system of the present invention. The embodiment represents the case in which the transmission system of the present invention includes a conventional video tape recorder. Referring to the drawing, a broadband video signal applied to an input terminal 10 is supplied to a low pass filter 12 which eliminates the signal component having a frequency higher than $f_c$ from the input video signal. The video signal thus passed through the low pass filter 12 is supplied to an analog-to-digital converter 14.

The analog-to-digital converter 14 samples the video signal with the sampling signal having the sampling frequency $f_c$ to form a sampled digital video signal. In the present embodiment, the sampling frequency $f_c$ is set to 5.011363 MHz according to the aforementioned equation with N being chosen to 637 and M being chosen to 2. This value of the sampling frequency $f_c$ will be referred to hereinafter as "5 MHz" for the sake of simplicity. This sampling frequency $f_c$ satisfies the conditions that the sampling frequency should be higher than the maximum frequency of the current video signal $f_m$ (4.2 MHz in the case of the NTSC format video signal) and that it should be lower than twice the upper frequency limit of the conventional video recorder (about 3 MHz) which is regarded as a part of the transmission medium in the present embodiment.

Figure 4:
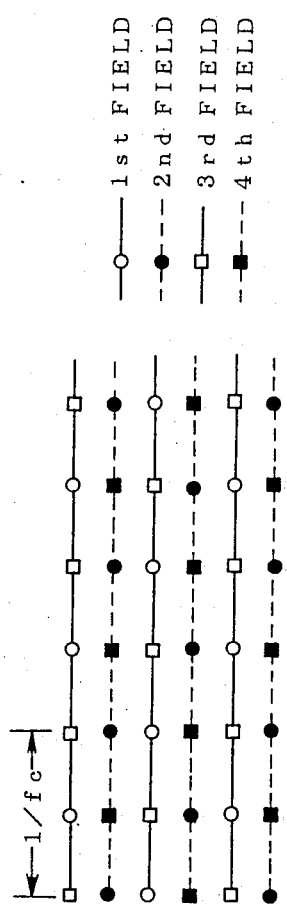
FIG. 4 is a diagram showing an example of the array of sampling points formed on the display screen as a result of the processing in the video signal transmission system of the present invention.
Figure 5:
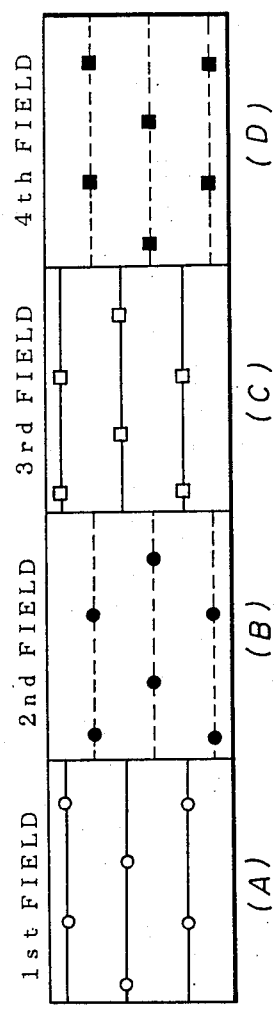
FIG. 5, (A)-(D) are diagrams respectively showing the array of the sampling points in each field of the video signal processed in the video signal transmission system of the present invention.

FIG. 4 schematically shows an array of sampling points sampled with the sampling frequency $f_c$ which is chosen to be about 5 MHz in the case of the present embodiment. In the drawing, the sampling points for the first field are represented by open circles, the sampling points for the second field are represented by solid circles, the sampling points for the third field are represented by open squares, and the sampling points for the fourth field are represented by solid squares. The position of the sampling points on the scanning line is shifted in each field by a predetermined amount, and four such arrays of sampling points or sampling patterns are repeated in every two frames.

Referring to FIG. 3, again, the sampled signal produced by the analog-to-digital converter 14 with the sampling frequency $f_c$ is supplied to a digital-to-analog converter 16 where it is converted back to an analog signal with a clock frequency which is equal to the sampling frequency $f_c$. As described previously, this sampling frequency $f_c$ is set to about 5 MHz. The analog signal thus produced by the digital-to-analog converter 16 is passed through a low pass filter 18 having a cut off frequency $f_c/2$. In the present embodiment, the cut off frequency $f_c/2$ is set to about 2.5 MHz. In the low pass filter 18, the frequency components having a frequency lower than a half of the sampling frequency $f_c$ is eliminated and the analog video signal thus processed is supplied to a video tape recorder 20 which forms a part of the transmission medium used in the present invention.

The video tape recorder 20 may be a commonly used home video tape recorder having a usual frequency range, and the video tape recorder records the video signal from the low pass filter 18 on a magnetic tape having a conventional characteristic and performance with a known procedure. As a result of the sampling in the analog-to-digital and digital-to-analog converters 14 and 16, the video signal recorded on the magnetic tape has a pattern of sampling points as illustrated in FIG. 4, (A)–(D) for the first through fourth fields. In other words, the video signal is recorded on the magnetic tape as illustrated in FIG. 4, (A) in the first field, as illustrated in FIG. 4, (B) in the second field, as illustrated in FIG. 4, (C) in the third field (the first field of the second frame), and as illustrated in FIG. 4, (D) in the fourth field (the second field of the second frame). As the maximum frequency of the analog video signal thus processed is $f_c/2$, the video signal can be recorded on the conventional magnetic tape without problem.

At the time of playback of the analog video signal by the video tape recorder 20, the video signals comprising the sampled picture elements as illustrated in FIG. 4, (A)–(D) are reproduced sequentially with a repetition period of four fields, though the picture quality of the individual picture is slightly deteriorated as compared to the case of the Nyquist sampling in which the sampling frequency $f_c$ is set at least twice the maximum frequency of the video signal. Thus, the analog video signal processed and recorded in accordance with the video signal transmission system of the present invention can be reproduced by the conventional video tape recorder with a tolerable picture quality. In other words, the video signal transmission system of the present invention provides a compatibility with existing transmission system such as a video tape recorder.

The sampling points for the first field and for the third field (see FIG. 4) do not overlap each other as long as the ratio N/M is chosen to be a reduced fraction larger than one. When the integer M is chosen to be two, the sampling points for the third field are located at an intermediate position between two adjacent sampling points of the first field as illustrated in FIG. 4. The same is also true for the sampling points for the second and fourth fields.

Figure 6:
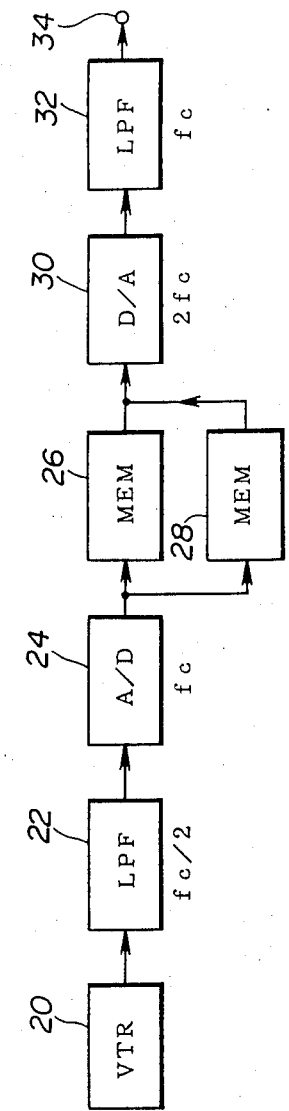
FIG. 6 is a system block diagram showing the other part of the embodiment of the video signal transmission system of the present invention.

Next, an embodiment of the receiving system (reproducing system in the case of video tape recorder) of the video signal transmission system of the present invention will be described with reference to FIGS. 6–8, (A) and (B). Referring to FIG. 6, the analog video signal reproduced by the video tape recorder 20 is passed through a low pass filter 22 having a cut off frequency $f_c/2$, which is in this case set to about 2.5 MHz. In the low pass filter 22, the undesirable high frequency components are eliminated and the video signal is supplied to an analog-to-digital converter 24 where it is sampled with the sampling frequency $f_c$. Thus, the analog video signal is converted to a resampled digital video signal.

The resampled digital video signal is then supplied to a pair of field memories 26 and 28 alternately. The field memories 26 and 28 are operated alternately in the write-in mode and in the read-out mode such that the content of the field memory corresponding to one field of the video signal is read out from the one of the field memories while one field of the resampled digital video signal is written into the other of the field memories.

Figure 7:
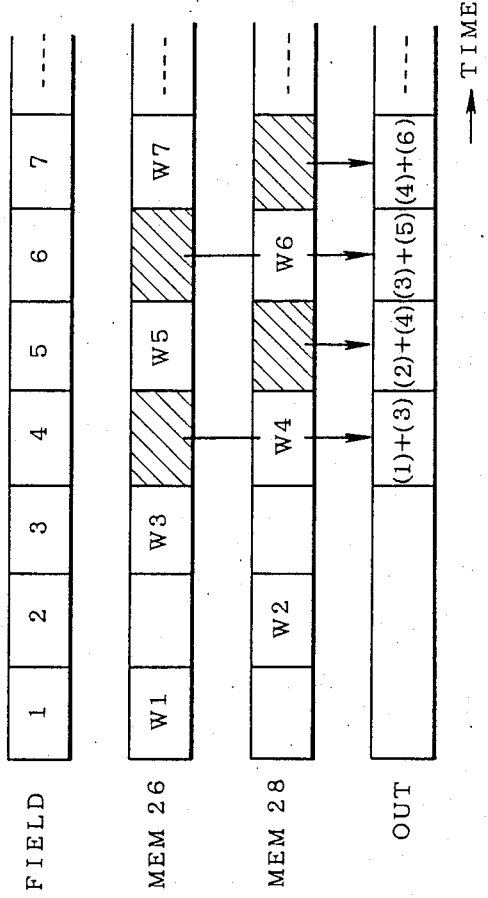
FIG. 7 is a drawing showing the operation of the memories illustrated in FIG. 6.

FIG. 7 schematically illustrates the operation of the field memories. Referring to the drawing, the first field of the resampled digital video signal is written into the first field memory 26. Next, the second field of the resampled digital video signal is written into the second field memory 28. Further, the third field of the resampled digital video signal (the first field of the subsequent resampled digital video signal) is written into the first field memory 26. It should be noted that the first field memory 26 is already written in with the first field resampled digital video signal. However, the first field of the resampled digital video signal occupies only one half of the memory space of the field memory 26, as the sampling frequency $f_c$ is set to about 5 MHz which is a half of the usual sampling frequency which is chosen to be about 10 MHz and the number of the sampling points is only one half of the sampling points of the conventional Nyquist sampling. Thus, there is a memory space in the field memory 26 available for storing the third field of the resampled digital video signal.

The fourth field of the resampled digital video signal (the second filed of the subsequent resampled digital video signal) is similarly stored in the memory space not occupied with the second field of the resampled digital video signal. Further, at the same time as the write-in operation of the field memory 28, the content of the first field memory 26 is read out to produce a first field reproduced digital signal. This first field reproduced digital signal contains the information for the first and third fields of the two successive input video signals.

Similarly, the fifth field of the resampled digital video signal (the first field of the resampled digital video signal subsequent to the resampled digital signal containing the third field) is stored in the first field memory 26 in the memory space which was occupied by the first field reproduced digital signal by erasing the content of the memory space, and at the same time the content of the second field 28 is read out and fourth field reproduced digital signal containing the informations for the second and fourth fields of the two successive input video signals is produced. At the end of this step, the first field memory 26 is completely occupied by the resampled digital video signal of the third and fifth fields.

As will be apparent from the description heretofore, the field memories 26 and 28 are read out with a speed which is twice as fast as the speed for the write-in operation. Such alternate read-out and write-in operations are repeated and the reproduced digital video signals containing informations of two fields of video signals in two successive frames are produced successively.

The reproduced digital video signal is supplied to a digital-to-analog converter 30 which is operated with a clock frequency of $2f_c$ (about 10 MHz in the present embodiment) where the digital video signal is converted to analog signal to form a reproduced analog video signal. This reproduced analog video signal is further passed through a low pass filter 32 for elimination of the frequency components higher than the frequency $f_c$ (about 5 MHz in the case of the present embodiment). Thus, a high resolution reproduced video signal is produced in the low pass filter 32 and is obtained at an output terminal 34.

Figure 8:
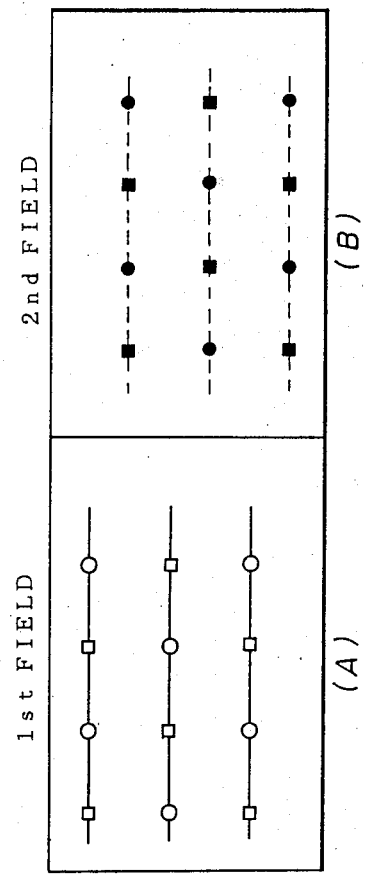
FIG. 8 is a diagram showing the array of sampling points in each field of the reproduced picture reproduced by the system in FIG. 6.

The high resolution reproduced video signal at the output terminal 34 is schematically illustrated in FIG. 8, (A) and (B). In the drawings, FIG. 8, (A) represents the first field and FIG. 8, (B) represents the second field. In the first field, the sampling points corresponding to the first and third field resampled digital video signals are superposed alternately along the scanning line and the apparent sampling frequency becomes equivalent to $2f_c$ (about 10 MHz in the case of the embodiment). Similarly, the second and fourth field resampled digital video signals are superposed alternately along the adjacent scanning line. Thus, representation of the picture with excellent resolution can be achieved.

As the present invention utilizes the frame correlation in order to achieve the band compression, there arises a problem for the video signals having no or a lesser degree of frame correlation as in the case of moving pictures. However, such moving pictures can be satisfactorily processed by detecting the movement of the picture and applying a known correction to such movement.

Although the present invention is described with reference to the video tape recorder in the description heretofore, the video signal transmission system of the present invention can also be applied to other recording media such as a magnetic disk, or to the cable or wireless transmission systems in general for transmission of the video signals.

Further, the present invention is not limited to these embodiments but various variations and modifications may be made without departing from the scope of the present invention.

What is claimed is:

1. A method for recording a video signal arranged as a repetition of a number of fields with a predetermined number of horizontal scanning lines in each of the fields and having a maximum signal frequency on a recording medium having a maximum recording frequency, said maximum signal frequency being higher than the maximum recording frequency but lower than a predetermined frequency which is twice as large as the maximum recording frequency, comprising the steps of:

sampling the video signal with a first sampling frequency set lower than the predetermined frequency but higher than the maximum signal frequency for each consecutive repetition of first through fourth fields of the video signal for producing first through fourth sampled video signals respectively corresponding to the first through fourth fields for each consecutive repetition of the first through fourth fields of the video signal;

performing said sampling, in each repetition of the first through fourth fields, with a timing such that the timing of sampling performed on each scanning line in the first field is offset with respect to the timing of sampling performed on the corresponding scanning line in the third field and such that the timing of sampling in the second field is offset with respect to the timing of sampling in the fourth field;

eliminating a frequency component higher in frequency than one-half of the sampling frequency from the first through fourth sampled video signals; and recording the first through fourth sampled video signals, after the step of eliminating the frequency component, on the recording medium consecutively for each repetition of the first through fourth fields.

2. A method as claimed in claim 1 in which said timing of sampling is achieved by using the first sampling frequency set to be a multiple of a horizontal scanning frequency by a rational number other than integers.

3. A method as claimed in claim 2 in which said first sampling frequency is set such that the timing of sampling performed on each scanning line in the first field is offset with respect to the timing of sampling performed on the corresponding scanning line in the third field by one-half of a sampling interval determined by the first sampling frequency and the horizontal scanning frequency and such that the timing of sampling in the second field is offset with respect to the timing of sampling in the fourth field by one-half of the sampling interval.

4. A method for recording an original video signal of a first resolution arranged as a repetition of a number of fields with a predetermined number of horizontal scanning lines in each of the fields and having a maximum signal frequency, and for obtaining a reproduced high definition signal having a second, improved resolution, on and from a recording medium having a maximum recording frequency, said maximum signal frequency being higher than the maximum recording frequency but lower than a predetermined frequency which is twice as large as the maximum recording frequency, comprising the steps of:

sampling the original video signal with a first sampling frequency set lower than the predetermined frequency but higher than the maximum signal frequency for each consecutive repetition of first through fourth fields of the original video signal for producing first through fourth sampled video signals respectively corresponding to the first through fourth fields for each consecutive repetition of the first through fourth fields of the original video signal;

performing said sampling, in each repetition of the first through fourth fields, with a timing such that the timing of sampling performed on each scanning line in the first field is offset with respect to the timing of sampling performed on the corresponding scanning line in the third field and such that the timing of sampling in the second field is offset with respect to the timing of sampling in the fourth field;

eliminating a frequency component higher in frequency than one-half of the sampling frequency from the first through fourth sampled video signals;

recording the first through fourth sampled video signals, after the step of eliminating the frequency component, on the recording medium consecutively for each repetition of the first through fourth fields;

reproducing the first through fourth sampled video signals consecutively from the recording medium by sampling at the first sampling frequency to produce first through fourth reproduced video signals;

summing the first and third reproduced video signals and storing a sum in first memory means as a first sum, and further summing the second and fourth reproduced video signals and storing a sum in second memory means as a second sum; and;

synthesizing the reproduced high definition video signal by reading the first sum and the second sum from the first and second memory means using a second sampling frequency set twice as large as the first sampling frequency.

* * * * *